(12) United States Patent
Kawashima et al.

(10) Patent No.: US 7,601,782 B2
(45) Date of Patent: Oct. 13, 2009

(54) COMPOSITION OF POLYARYLENESULFIDE, BISPHENOL EPOXY RESIN AND OXAZOLINE-CONTAINING AMORPHOUS POLYMER

(75) Inventors: Kiyotaka Kawashima, Kishiwada (JP); Tsuneyuki Adachi, Nara (JP)

(73) Assignee: Dainippon Ink & Chemicals, Inc., Tokyo (JP)

( * ) Notice: Subject to any disclaimer, the term of this patent is extended or adjusted under 35 U.S.C. 154(b) by 0 days.

(21) Appl. No.: 10/430,343

(22) Filed: May 7, 2003

(65) Prior Publication Data

US 2003/0212204 A1 Nov. 13, 2003

Related U.S. Application Data

(62) Division of application No. 09/362,104, filed on Jul. 28, 1999, now Pat. No. 6,579,936.

(30) Foreign Application Priority Data

Jul. 30, 1998 (JP) ................................. 10-214682

(51) Int. Cl.
*C08L 25/12* (2006.01)
*C08L 37/00* (2006.01)
*C08L 81/04* (2006.01)

(52) U.S. Cl. ..................... 525/117; 525/189; 525/537

(58) Field of Classification Search ................. 523/467; 525/65, 111.5, 117
See application file for complete search history.

(56) References Cited

U.S. PATENT DOCUMENTS

| | | | | |
|---|---|---|---|---|
| 4,528,346 A | * | 7/1985 | Sugie et al. | ................. 525/523 |
| 5,149,731 A | | 9/1992 | Uota et al. | ................. 524/264 |
| 5,302,651 A | | 4/1994 | Kawashima et al. | ........ 524/306 |

FOREIGN PATENT DOCUMENTS

| | | |
|---|---|---|
| EP | 0 104 543 | 4/1984 |
| EP | 0 305 539 | 3/1989 |
| EP | 0 341 421 | 11/1989 |
| EP | 341421 A2 * | 11/1989 |
| EP | 0 424 939 | 5/1991 |
| EP | 0 458 462 | 11/1991 |
| JP | 3-122160 | 5/1991 |
| JP | 03122160 A * | 5/1991 |
| JP | 3-197562 | 8/1991 |
| JP | 6-93180 | 4/1994 |
| JP | 06093180 A * | 4/1994 |

* cited by examiner

*Primary Examiner*—Robert Sellers
(74) *Attorney, Agent, or Firm*—Edwards Angell Palmer & Dodge LLP (57) ABSTRACT

Polyarylenesulfide resin compositions are provided having a dramatically improved adhesiveness with regard to the cured epoxy resin, while maintaining characteristics of polyarylenesulfide resins such as a heat resistivity and a chemical resistivity. The above described polyarylenesulfide resin compositions are obtained by comprising as essential components the allylenesulfide resin (A), bisphenol-type epoxy resin (B), and an oxazoline-group-containing amorphous polymer (C). The thus obtained polyarylenesulfide resin compositions can be used as superior engineering plastics in wide application fields such as electronic and other devices.

6 Claims, 1 Drawing Sheet

Fig. 1

COMPOSITION OF POLYARYLENESULFIDE, BISPHENOL EPOXY RESIN AND OXAZOLINE-CONTAINING AMORPHOUS POLYMER

This application is a divisional of application Ser. No. 09/362,104 filed Jul. 28, 1999, U.S. Pat. No. 6,579,936.

BACKGROUND ART

1. Field of the Invention

The present application relates to polyarylenesulfide resin compositions having a dramatically improved adhesiveness with regard to a cured epoxy resin, while retaining characteristic properties of polyarylenesulfide resins such as heat resistance and chemical resistance; and relates practically to useful polyarylenesulfide resin compositions in a wide range of industrial fields, such as an ignition coil case for cars used by sealing the ignition coil in the coil case made of the polyarylenesulfide resin with an epoxy resin composition; and a coil case in a so-called "distributorless ignition system (hereinafter, abbreviated as "DLI") which is produced by integrating the plug and an ignition coil; and furthermore relates to electric and electronic components such as epoxy resin sealed type semiconductor devices.

2. Background Art

Recently, polyarylenesulfide (hereinafter, abbreviated as "PAS") has attracted attention as an excellent engineering plastic having superior heat and chemical resistances.

One of the application fields of the PAS resin utilizing these features is producing various electronic and electric components by sealing various electronic electric elements in casings made of the PAS resin composition formed in advance by injection molding. That is, in order to develop a new technique for producing electronic and electric components (especially, ignition coils for DLI), semiconductor elements or coils are first mounted in a casing made of PAS resin, uncured epoxy resin is poured in the casing for sealing these elements or coils, and the epoxy resin is finally cured by, for example, heat treatment for sealing these semiconductor elements or coils into the casing.

When the PAS resin is used for such applications, it is necessary for the PAS resin products to be provided with a superior long-term adhesiveness to the epoxy resin at wide ranges of usage temperatures, in addition to the intrinsic characteristics such as long-term heat and chemical resistance properties. Practically, it is required that the PAS resin products sealed by epoxy resin do not peel off from the epoxy sealant, even when the PAS resin products sealed by epoxy resin is repeatedly used in a temperature range of −40° C. to 140° C. As a matter of fact, since the PAS resin is intrinsically inferior in adhesiveness to epoxy resin, and the adhesion is weak even if it is reinforced by glass fibers or the like, the PAS resin has been considered not suitable for use for sealing applications with epoxy resins.

In order to improve the adhesion of the PAS resin with the epoxy resin, Japanese Patent Application, First Publication No. Hei 9-3326, discloses a technique for improving the adhesion by addition of α-olefine/α,β-unsaturated carboxylic acid glycidylester copolymer and an amide carboxylic acid-type wax to the PAS resin for relieving stress caused at an interface between the PAS resin and the epoxy resin at the time of heating and cooling.

However, the PAS resin composition disclosed in Japanese Patent Application, First Publication No. Hei 9-3326, does not exhibit a satisfactory adhesiveness with the epoxy resin and generation of cracks are observed in the heating and cooling cycles, which means that conventional PAS resins are not sufficient to satisfy the level for practical use.

SUMMARY OF THE INVENTION

It is therefore an object of the present invention to provide a PAS resin which has an dramatically improved adhesion strength with the epoxy resin during heating and cooling operations, while retaining its intrinsic superior heat and chemical resistances, and which has an improved crack resistance in heating and cooling cycles by incorporating a resin for improving the impact resistance.

The inventors of the present invention have carried out a series of studies for solving the above problems, and they have completed the present invention by discovering that the adhesiveness of the PAS resin can be dramatically improved by incorporating a bisphenol-type epoxy resin and an oxazoline-group-containing amorphous polymer, and that a superior crack resistance can be additionally provided to the PAS resin by incorporating a bisphenol-type epoxy resin, an oxazoline-group-containing copolymer, and an impact resistance improving resin.

That is, the present invention relates to a polyarylenesulfide resin composition, wherein the polyarylenesulfide composition essentially contains polyarylenesulfide resin (A), bisphenol-type epoxy resin (B), and oxazoline-group-containing amorphous polymer (C).

Although there is not particular limitation polyarylenesulfide resin (A), it is preferable for the polyarylenesulfide (A) to have repetitive structural units expressed by a general formula 1 [—Ar—S—] (in the formula, —Ar— represents divalent aromatic group including at least one six-membered ring of carbon) as the main structural units, and it is more preferable for the polyarylenesulfide to contain more than 70 mol % of such structural units shown in the general formula 1 from the point of view of heat and chemical resistances.

Among polyarylenesulfide compositions containing more than 70 mol % of structural units expressed by the general formula 1, polyphenylene sulfide (hereinafter, abbreviated as "PPS") containing repetitive structural units expressed by the general formula 2 [-φ-S—] is preferable, and it is particularly preferable for a polymer to contain more than 70 mol % respective structural units expressed by the general formula 2 from the point of view of high mechanical strength which is a characteristic property for a crystalline polymer and also from point of view of toughness and the chemical resistance.

Examples of copolymer components having the structural unit in the polyarylenesulfide resin (A) expressed by the general formula 1 include couplings such as a metha-coupling, ether-coupling, sulfonic-, sulfonic-coupling, sulfide-ketone-coupling, biphenyl-coupling, substituted phenylsulfide-coupling, biphenyl-coupling, substituted phenylsulfide coupling, tri-functional phenylsulfide, and naphthyl coupling, which are illustrated below by chemical formulas 2 to 10. The content of the copolymer component is preferably less than 30 mol %, but, when a coupling more than a tri-functional coupling is included, the content is preferably less than 5 mol %, more preferably less than 3 mol %.

(2)

-continued (3)

(4)

(5)

(6)

(7)

(8)

(in the formula, R represents an alkyl group, a nitro group, a phenyl group or a alcoxy group)

(9)

(10)

It is noted that the polyarylenesulfide resin (A) used in the present invention has a superior reactivity with the (B) or (C) components a superior compatibility with the (B) and (C) (here, compatibility means a capability of being smaller particles size of the component (B), (C) or (D)), and the resin (A) is capable of providing the high adhesiveness with the epoxy resin. From the point of view of the above superior reactivity of the (B) and (C) components and high adhesiveness to the cured epoxy resin, it is preferable for the polyarylenesulfide resin to provide the following properties; ΔHCl is not more than 10 μmol/g, ΔNaOH is within 5 to 30 μmol/g, and (ΔNaOH−ΔHCl)≧5 μmol/g.

Here, ΔHCl, ΔNaOH, and (ΔNaOH −ΔHCl) are obtained by the following measurements.

10 g of polyarylenesulfide resin (A) is stirred after adding 10 ml of 1 mol/l of HCl, and the suspension is filtrated. The separated solid is repeatedly washed by water until the HCl is not detected, and all of filtrate used for washing is collected and HCl in the collected filtrate is titrated by NaOH, and the molar number of HCl is defined as ΔHCl.

Next, the polyarylenesulfide resin (A) after washing by water is again dispersed in distilled water and stirred after adding 10 ml of 1 mol/l of NaOH. The solution is filtrated after stirring, and the filtrated solid is repeatedly washed by water until NaOH is not detected. All the filtrate used for washing is collected and NaOH in the filtrate is titrated by HCl, and the molar number of NaOH is defined as ΔNaOH. The (ΔNaOH−ΔHCl) is a difference between ΔNaOH and ΔHCl.

It is preferable that the concentration of the terminal thiol groups of the polyarylenesulfide resin (A) is within a range of 5 to 50 μmol/g in order to provide the resin (A) with a superior reactivity with the components (B) and (C), a good compatibility, a superior processability, and a good flowability. That is, when the concentration increases to 5 μmol/g, the dispersion ability increases, and when the concentration decreases below less than 50 μmol/g or more than 5 μmol/g, the flowability becomes superior.

The concentration of the terminal thiol groups is obtained by the iodoacetamide method. The iodoacetamide method is carried out by the steps of acidifying the PAS resin by an acid such as hydrochloride for converting into thiol groups and subsequently generating the iodine by the reaction of iodoacetamide with all of the terminal thiol groups by heating; while the concentration of the terminal thiol groups present in the PAS resin at the initial stage is obtained by calculating the molar number of acid consumed for acidification and the molar number of iodine determined by UV spectrometry.

In more detail, the practical procedures of the measurement are as follows.

10 mg to 1 g of the powdered PAS resin sample is weighed, after the weighed sample is put into a sealed test tube, 1 ml of acetone and 3 ml of pure water are added, and stirred after further addition of diluted hydrochloride. After stirring, a filtrate by filtration is back titrated by use of NaOH solution for obtaining the molar number of the hydrochloride consumed for terminal acidification. Subsequently, after being separated by filtration, the polymer sample is washed by pure water for 30 minutes, 2.5 ml of acetone solution consisting of 2.5 ml of acetone and 50 mmol of iodoacetamide is added, seal by a stopper, heated at 100° C. for 60 minutes, the water is cooled and the seal is opened, the liquid phase is separated, and absorbance at 450 nm (absorbance at 12) is measured by the ultraviolet light absorption spectrometer. The concentration of the whole terminal thiol groups is calculated by the use of a calibration curve produced in advance for model thiol compounds "C1-C6H4-SH" (it is preferable to select a sample amount such that the concentration of the thiol compound in the actone slurry falls within a range of 0.1 to 0.3 mmol). The molar number obtained by subtracting the molar number of hydrochloride consumed for terminal acidification from the whole terminal thiol groups is the concentration of the terminal thiol groups of the PAS resin. The average concentration of the terminal thiol groups for the same powdered sample is obtained by taking three measurements.

Any molecular structures of the polyarylenesulfide resin (A) may used in the present invention whether the molecules are substantially linear structure without having branching or bridging structures, or the molecules having branching or bridging structures, the resin (A) having a linear molecular structure is preferable from the points of view of reactivity and compatibility.

Although there is not particular limitation in the polymerization method of such a polyarylenesulfide resin (A), certain polymerization methods are preferable, including a nucleophlilic displacement method such as a method ① by a reaction of a halogen substituted aromatic compound with an alkali sulfide. Some practical examples of the above method ① include:

①-1: a method of polymerizing p-dichlorobenzene under presence of sulfur and sodium carbonate;

①-2: a method of reacting p-dichlorobenzene with sodium sulfide in a polar solvent;

①-3: a method of reacting p-dichlorobenzene with sodium hydrogensulfide and sodium hydroxide in a polar solvent; and ①-4: a method of reacting p-dichlorobenzene with hydrogen sulfide and sodium hydroxide in a polar solvent.

Furthermore, another method ②, consists of self-condensation of the thiophenols such as p-chlorothiophenol under co-presence of alkali catalysts such as potassium carbonate or sodium carbonate and a copper salt such as copper iodite. Examples of polar solvents used in the method ① include amide-type solvents such as N-metlylpyrrolidone, dimethylacetoamide; and sulfolane.

The other polymerization method is an electrophilic substitution reaction constituting a method ③ which is a condensation polymerization of aromatic compounds such as benzen with sulfur chloride under presence of a catalyst of a Lewis acid catalyst by a Fridel-Crafts reaction.

Among these polymerization methods, the preferable one is ①-2, since this method allows yielding a polyarylenesulfide resin having a large molecular weight and also allows obtaining a high polymerization yield.

Practically, the most preferable method is to react p-dichlorobenzene with sodium sulfide in amide-type solvents such as N-methylpyrrolidone or dimethylacetamide; and in sulfone-type solvents such as sulfolane. It is also preferable to add alkaline metal salts of carboxylic acid and sulfonic acid, or alkali hydroxide in order to control the degree of polymerization.

As described above, it is preferable for the polyarylenesulfide resin (A) to have a substantially linear structure from points of view of reactivity and compatibility. Although there is not particular limitation, examples of methods of producing the polyarylenesulfide resin having a substantially linear structure include reacting alkali-metal sulfide and organic alkali metal carboxylates such as dihalo-aromatic compounds and lithium acetate in an amide-type solvent such as N-methylpyrrolidone and dimethylacetamide; and a water-addition two stage polymerization method to add a large amount of water and increase the polymerization temperature of the reaction system during the polymerization reaction of the dihalo-aromatic compound with an alkaline metal sulfide in an organic amide-type solvent.

Particularly, the polyarylenesulfide resin (A) having a substantially linear structure suitable for the present invention is preferably used after being subjected to acid treatment and washing.

Although there is no limitation for acids for the acid treatment if the acid does not decompose the polyarylenesulfide resin (A), examples of acids used for the acid treatment include acetic acid, hydrochloride, sulfuric acid, phosphoric acid, silicic acid, carbonic acid, and propyl acid. Among these, acetic acid and hydrochloride are preferably used. The methods of acid treatment include immersion of the polyarylenesulfide resin (A) in the acid or acid solution. Stirring or heating may be added during immersion if necessary. The acid treatment is carried out sufficiently in acetic acid by immersing the PAS resin in the acetic acid solution of pH4 heated at temperatures in a range of 80 to 90° C. for 30 minutes. The PAS resin after the acid treatment is washed by water or warm water several times in order to physically remove the remaining acid or salt. The water used for washing is preferably distilled water or deionized water.

The polyarylenesulfide resin (A) to be used for the acid treatment may be in the form of a power or in the form of a slurry obtained immediately after polymerization.

The bisphenol-type epoxy resin (B) is an essential component for dramatically improving, the adhesion of the PAS resin to the cured epoxy resin, and the bisphenol-type epoxy resin (B) is also useful in dramatically improving compatibility of the impact resistant component (D), when that component (D), which will be described in the later section, is also used.

As bisphenol-type epoxy resin (B), any type of the bisphenol-type epoxy resins may be used, without any limitation, including bisphenol A-type epoxy resin, bisphenol F-type epoxy resin, bisphenol AF-type epoxy resin, and bisphenol AD-type epoxy resin; and in the present invention, bisphenol A-type is most preferable because it greatly enhances the adhesiveness to the cured epoxy resin.

Examples of the practical bisphenol A-type epoxy resins include glycidylether of bisphenol A, and a compound in which glycidylether is converted into high molecular weight by use of bisphenol A.

It is preferable for bisphenol-type resin (B) to have all epoxy equivalent within a range of 150 to 2100 g/eq. The range of 700 to 2100 g/eq is more preferable for the resin (B) composition for providing better processability and better compatibility.

The oxazoline-group-containing amorphous polymer (C), used as one of the essential components in the present invention, is useful, similar to the above described (B) component, for dramatically improving the adhesiveness of the cured epoxy resin and also useful for improving the compatibility of the impact resistance improving resin (D) in the PAS resin. That is, in the present invention, the PAS resin exhibits an unusual superior adhesion capability to the cured epoxy resin by use of the (B) component and the (C) component together. The oxazoline-group-containing amorphous polymer (C) is quite effective for fine dispersion of the impact resistance improving resin (D) in the PAS resin and for improving the thermal shock resistance of the resin composition product as a whole.

Here, the oxazoline-group-containing amorphous polymer (C) is the polymer which is in an solidified state by cooling from a higher temperature range than the transition temperature or the melting point, and which contains an amorphous structure of more than 80 wt % at temperature region below 200° C.

Practically, examples of the oxazoline-group-containing amorphous polymer (C) include a homopolymerization of oxazolinyl group containing polymerizable unsaturated monomer and a copolymer of said monomer and the other polymerizable unsaturated monomers.

A preferable example of the oxazolinyl group containing polymerizable unsaturated monomer is vinyloxazoline. Examples of the other polymerizable unsaturated monomers which are co-polymerizable with the oxazolinyl group containing polymerizable unsaturated monomer include aromatic vinyls such as styrene; vinyl cyanides or vinyl acetates such as acrylonitrile; unsaturated carboxylic acids or its derivatives such as (meth)acrylic acid, (meth)acrylate ester, maleic acid anhydride; and diene components such as α-olefin, butadiene, and isoprene. Among these examples, styrene and acrylonitrile are preferable from the point of view of compatibility.

The copolymers of the oxazolinyl group containing polymerizable unsaturated monomer and the other polymerizable unsaturated monomer is preferably a binary or ternary copolymer selected from the above monomer components, and practically a combination of vinyloxazoline and styrene and/or acrylonitrile is preferable.

In the present invention, addition of the impact resistance improving resin (D) in addition to the above (A) to (C) components dramatically improves the toughness of the formed products, the adhesiveness to the cured epoxy resin, and, as described above, the crack resistance property by thermal shock cycles.

Although there is no limitation in selecting the impact resistance improving resin (D), it is preferable to use vinyl-type polymers (d1) containing acid- or epoxy-group and a gum polymer (d2) containing an acid- or epoxy group in order to improve the crack resistance property.

Although there is no particular limitation, preferable examples of the vinyl-type polymers (d1) containing acid- or epoxy-group include α-polyolefin (d1-1) containing acid- or epoxy-group or α,β-unsaturated carboxylic acid alkylester polymer (d1-2) containing acid- or epoxy-group.

Although there is no particular limitation, examples of the α-polyolefin (d1-1) containing acid- or epoxy-group include copolymers of α-olefin, and α,β-unsaturated carboxylic acids or their anhydrides, copolymers of α-olefin, and α,β-unsaturated carboxylic acids or their anhydrides, and α,β-unsaturated alkylester carboxylates; copolymers of α-olefins, α,β-unsaturated glycidylester carboxylates; and copolymers of α-olefins, α,β-unsaturated glycidylester carboxylates, and α,β-unsaturated alkylester carboxylates.

Here, examples of α-olefin include ethylene, propylene, butene-1, pentene-1, hexene-1, heptene-1,3-methylbutene-1, 4-methylpentene-1, and their combinations, but the preferable example is ethylene.

Examples of α,β-unsaturated carboxylic acids or their anhydrides include acrylic acid, methacrylic acid, crytonic acid, maleic acid, fumaric acid, itaconic acid, citraconic acid, butanedicarbonic acid and their anhydrides, and maleic anhydride and succinic anhydride are the most preferable examples.

Examples of α,β-unsaturated glycidylester carboxylates include glycidylacrylate, glycidylmethacrylate, glycidylethacrlate, and the preferable example is glycidylmethacrylate.

Examples of α,β-unsaturated alkylester carboxylates include unsaturated carboxylic acids of 3 to 8 carbon atoms such as alkylesters including acrylic acid, methacrylic acid, and ethacrylic acid; and practical examples include methylacrylate, ethlylacrylate, n-propylacrylate, isopropylacrylate, n-butylacrylate, t-butylacrylate, isobutylacrylate, methylmethacrylate, ethylmethacrylate, n-propylmethacrylate, isopropylmethacrylate, n-butylmethacrylate, t-butylmethacrylate, isobutylmethacrylate, and preferable examples are methylacrylate, ethylacrylate, and n-butylacrylate.

In α,β-unsaturated carboxylic acids or their anhydrides, although there is no particular limitation, a denaturation ratio of each monomer component for α-olefin is not more than 10 wt %, preferably in a range of 0.1 to 5 wt % for a unit weight of copolymer, when the denaturated portion is converted as the weight of the monomer in the copolymer. When α,β-unsaturated alkylester carboxylate is additionally used, the preferable range changes into 5 to 35 wt %.

The α,β-unsaturated alkylester carboxylate polymers (d1-2) containing acid- or epoxy-group have a structure in which the acid-group or epoxy group is introduced into the α,β-unsaturated alkylester carboxylate polymer, and the practical example is a compound obtained by co-polymerization of α,β-unsaturated carboxylic acid or its anhydride, or a α,β-unsaturated glycidylester carboxylate or its anhydride with α,β-unsaturated alkylester carboxylates.

Any examples of the above described α,β-unsaturated alkylester carboxylates may be used in the present invention, and the practical examples is a carboxylic acid of 3 to 8 carbon atoms including acrylates such as methylacrylate, ethylacrylate, n-propylacrylate, isopropylacrylate, n-butylacrylate, t-butylacrylate, isobutylacrylate, methylmethacrylate, ethylmethacrylate, n-propylmethacrylate, isopropylmethacrylate, n-butylmethacrylate, t-butylmethacrylate, and isobutylacrylate; and they may be used alone or in combination. Among, these compounds, the most preferable examples include methylacrylate, ethylacrylate, and n-butylacrylate.

Examples of α,β-unsaturated carboxylic acids or their anhydrides for co-polymerizing, with α,β-unsaturated alkylester carboxylates include acrylic acid, methacrylic acid, ethacrylic acid, clitonic acid, maleic acid, fumaric acid, itacoic acid, citracoic acid, butenedicarboxylic acid and their anhydrides; and preferable examples are maleic anhydride and succinic anhydride.

Practical examples of α,β-unsaturated glycidylester carboxylates for copolymerizing with α,β-unsaturated alkylester carboxylates include glycidylacrylate, glycidylmethacrylate, and glycidylethacrylate; and glycidylmethacrylate is preferably used.

When structural units in a copolymer are converted into an weight ratio of a monomer, the denaturation ratio of α,β-unsaturated carboxylic acids and their anhydrides is within a range of 0.01 to 10 wt %, more preferably in a range of 0.05 to 5 wt % for a unit weight of the copolymer. The denaturation ratio of α,β-unsaturated glycidylester carboxylates used for co-polymerizing with α,β-unsaturated alkylester carboxylates is preferably in a range of 0.1 to 15 wt %, and more preferably in a range of 5 to 10 wt % per a unit weight of the copolymer.

Hereinafter, a gum-type polymer (d2) containing acid- or epoxy-group is described. Although there is not particular limitation, the gum-type polymer (d2) containing, acid- or epoxy-group is preferably a hydrogenated copolymer containing acid- or epoxy-group of conjugated dienes and aromatic vinyl monomers. A practical example is a compound obtained by graft co-polymerization of hydrogenated copolymer of conjugated dienes and aromatic vinyl monomers, with α,β-unsaturated carboxylic acids or their anhydrides or α,β-unsaturated glycidylester carboxylates.

The hydrogenated copolymers of the conjugated dienes and the aromatic vinyl hydrocarbons are defined as a block copolymer or a random copolymer of conjugated dienes and aromatic vinyl hydrocarbons and at least 80% of the copolymer is reduced by hydrogenation. In the present invention, a block copolymer of conjugated dienes and aromatic vinyl hydrocarbons are preferably used. It is noted that the unsaturated bonds which are reduced by hydrogenation do not include double bonds of aromatic nucleus.

Examples of conjugated dienes include 1,3-butadiene, isoprene, 1,3-pentadiene, and among conjugated dienes, 1,3-butadiene and isoprene are preferable.

Examples of aromatic vinyl hydrocarbons include styrene, α-methylstyrene, o-methylstyrene, p-methylstyrene, 1,3-dimethylstyrene, and vinylnaphthalene; and styrene is the most preferable.

Practical examples of the hydrogenated copolymer of the conjugated dienes and the aromatic vinyl hydrocarbons include tri-block hydrogenated copolymer of styrene/butadiene/styrene and tri-block hydrogenated copolymer of styrene/isoprene/styrene, and tri-block hydrogenated copolymer of styrene/butadiene/styrene is preferable from the point of view of an excellent crack resistance property.

Examples of α,β-unsaturated carboxylic acids or their anhydrides used for graft co-polymerization with the hydrogenated copolymers shown in detail include acrylic acid, methacrylic acid, ethacrylic acid, clitonic acid, maleic acid, fumaric acid, itacoic acid, citracoic acid, butenedicarboxylic acid and their anhydrides; and preferable examples are maleic anhydride and succinic anhydride.

Practical examples of α,β-unsaturated glycidylcarboxylates include glycidylacrylate, glycidylmethacrylate, and glycidylethacrylate, and glycidylmethacrylate is particularly preferable.

Although there is not particular limitation, the content of the acid-group or the epoxy-group in the hydrogenated compounds (d2) is preferably in a range of 0.01 to 10 wt %, and more preferably in a range of 0.05 to 5 wt %, for the α,β-unsaturated carboxylic acids or their anhydrides; and preferably 0.1 to 15 wt %, and more preferably in a range of 0.5 to 10 wt %, when the content of the functional groups is calculated as the content of monomers in the raw material.

Among two compounds including the vinyl-type polymers (d1) containing acid- or epoxy-group and the gum-type polymers (d2) containing acid- or epoxy-group, compounds containing an acid-group are preferable for their excellent adhesiveness to the cured epoxy and superior crack resistance property, and these properties become remarkable and it is preferable to use the acid-group containing vinyl-type polymers (d1), and acid-group containing, α-olefin (d1-1) is more preferable, and copolymers of α-olefin, α,β-unsaturated carboxylic acids or their anhydrides, and α,β-unsaturated alkylester carboxylate are the most preferable.

Although the percentage content of the above described respective components in the composition of the present invention is not limited, preferable percentage contents of the polyarylenesulfide resin (A) is in a range of 30 to 90 wt %, that of bisphenol A-type epoxy resin (B) is in a range of 1 to 10 wt %, and that of oxazoline-group-containing polymer (C) is in a range of 1 to 20 wt % in order to yield remarkable effects. When the impact resistance improving component (D) is used together for improving the crack resistance property, the percentage content of the component (D) is preferably in a range of 0.5 to 20 wt %.

In the present invention, it is further preferable to incorporate fibrous reinforcing materials (E) in addition to the above described (A) to (C) or to (A) to (D).

The fibrous reinforcing materials are not particularly limited, if they attain the object of the present invention. Practical examples of fibrous reinforcing materials include glass fiber, carbon fiber, zinc oxide fiber, asbestos fiber, silica fiber, aluminum borate whisker, silica-alumina fiber, zirconia fiber, boron nitride fiber, silicon nitride fiber, potassium titanate fiber, inorganic fibrous materials such as metallic fibrous materials of stainless steel, aluminum, titanium, copper and brass; and high melting point organic fibrous materials such as aramid fiber, fibrous materials of polyamide, fluororesin, and acryl resins; and glass fiber is generally preferable.

Although the content of the fibrous material is not limited, a range of 5 to 50 wt % in the resin composition is a preferable range.

The fibrous reinforcing materials may be used for improving the crack resistance property against the thermal shock, and the PAS resin is reinforced to withstand the stress due to its own expansion and contraction such that the generation of crack is further suppressed.

The compatibilities of the PAS resin (A) with the oxazoline-group-containing polymer (C) and with the impact resistance improving resin (D) are further improved by incorporating, silane compounds (F). Particularly, the silane compounds are effective in a minute dispersion of the impact resistance improving resin (D) such that the impact resistance of the resin composition can be drasticaly improved.

Any silane coupling agents containing organic functional groups and silicon atoms in the molecular structure may be used as such silane compounds (F). Preferable examples of silane compounds (F) include alkoxysilane or phenoxysilane containing epoxy-group, alkoxysilane or phenoxysilane containing amino-group, and alkoxysilane or phenoxysilane containing isocyanate-group. These compounds may be used alone or in combinations of two or more.

It is preferable for epoxyalkoxysilane or epoxyphenoxysilane to have more than one epoxy group and to have two or three alkoxy- or phenoxy-groups, and examples of such silane compounds include γ-glycidoxypropyltriphenoxysilane, β-(3,4-epoxycyclohexyl)ethyltrimethoxysilame, and γ-glycidoxypropyltriethoxysilane.

It is preferable for aminoalkoxysilane or aminophenoxysilane to have more than one amino group and to have two or three alkoxy- or phenoxy-groups in one molecule; and examples of such silane compounds include γ-aminopropyltriethoxysilane, γ-aminopropyltrimethoxysilane, γ-aminopropyltriphenoxysilane, γ-aminopropylmethyldiethoxysilane, γ-aminopropylmethyldimethoxysilane, N-β-(aminoethyl)-γ-aminopropyltriethoxysilane, N-β-(aminoethyl)-γ-aminopropyltrimethoxysilane, N-β-(aminoethyl)-γ-aminopropylmethyldiethoxysilane, N-β-(aminoethyl)-γ-aminopropylmethyldimethoxysilane, N-phenyl-γ-aminopropyltriethoxysilane, and N-phenyl-γ-aminopropyltrimethoxysilane.

It is preferable for isocyanatealkoxysilane or isocyanatephenoxysilane to have more than one isocyanate group and to have two or three alkoxy- or phenoxy-groups in one molecule; and examples of such silane compounds include isocyanatepropyltriethoxysilane, isocyanatepropyltriphenoxysilane, isocyanatepropyltrimethoxysilane, and isocyanatepropylmethylyldiethoxysilane.

It is preferable to add the silane compound (F) in the present resin composition in a range of 0.01 to 3.0 wt %.

Further addition of the ester of the higher fatty acid of polyhydric alcohol (G) is useful for improving the mold lubrication of the resin and is also useful for further improving the adhesiveness of the resin products with the cured epoxy resin.

Here, the preferable polyhydric alcohol includes alcohol having more than two hydroxy-groups, and the preferable higher fatty acid includes saturated or unsaturated fatty acids of 8 to 45 carbon atoms.

Practical examples of esters of higher fatty acid of polyhydric alcohol include fatty acids such as caprylic acid, lauric acid, myristic acid, behenic acid, stearic acid, montanic acid, oleic acid, and palmitic acid; and esters of polyhydric alcohol and its branched polyester oligomer such as ethyleneglycol, glycerin, 2-methlylpropane-1,2,3,-triol, and pentaerythritol.

It is preferable to add the ester of the higher fatty acid of polyhydric alcohol (F) in a range of 0.01 to 3.0 wt % for the total amount of the resin composition.

From the point of view of improving the resistance against thermal decomposition of the PAS resin due to the high forming temperature, preferable examples of the compound (G) include ethyleneglycol, 2-methyl-1,2,3-triol, ester of montanic acid of pentaerythritol and its branched polyester oligomer.

The resin composition of the present invention may use inorganic fillers within a scope not contrary to the object. Examples of inorganic fillers include silicon carbide, boron nitride, various metal powders, barium sulfate, calcium sulfate, kaoline, clay, pyrophillite, bentonite, sericite, zeolite, mica, nephelincinite, talc, adalpaljite, wallastonite, PMF, ferrite, aluminium silicate, calcium silicate, calcium carbonate, magnesium carbonate, dolomite, antimony trioxide, zinc oxide, titanium oxide, alumina, magnesium oxide, magnesium hydroxide, iron oxide, molybdenum disulfide, graphite, gypsum, glass beads, glass powder, glass balloon, quartz, silica, and fused silica.

It is possible to add the other polymers to the present resin composition if they are effective in improving the resin products of the present invention. Examples of the other polymers include homopolymers or copolymers of monomers such as ethylene, butylene, pentene, isoprene, chloroprene, styrene, α-methylstyrene, vinylacetate, vinylchloride, acrylate ester, methacrlate ester, and (meth)acrylonitrile; homopolymers, random copolymer, block copolymer, or graft copolymer of monomers of polyesters such as polyurethane, polybutyleneterephthalate; polyacetal, polycarbonate, polyamide, polysulfone, polyallylsulfone, polyethersulfone, polyallylate, polyphenylleneoxide, polyetherketone, polyetheretherketone, polyimide, polyamideimide, polyetherimide, silicone resin, phenoxy resin, flororesin, liquid crystal polymer, and polyallylether.

It may be preferable to add to the present resin composition a plasticizer, a small amount of mold lubricant, a coloring, agent, a lubricant, a heat resistance stabilizer, a weathering, stabilizer, a forming agent, a rust-inhibitor, and a flame retarder.

The present resin composition can be prepared by conventionally known methods.

An example of a known method comprises the steps of mixing the PAS resin (A), bisphenol-type epoxy resin (B), and oxazoline-group-containing polymer (C) and further, if necessary, the impact resistance improving resin (D) and the other materials homogeneously by a mixer such as a tumbler- or a Henschel-type mixer, melting and kneading the mixture at temperatures ranging from 200 to 350° C. by means of a uniaxial or bi-axial extruding and kneading machine, and yielding pellets of the present resin composition.

The resin composition of the present invention has a superior adhesiveness with the cured epoxy resin, which is a product of a curing reaction of an epoxy resin and a curing agent.

Examples of the epoxy resins include bisphenol A, bisphenol F, bisphenol S, bisphenol AF, bisphenol AD, 4,4-dihydroxybiphenyl, resorcin, saligenin, trihydroxydiphenyldimthylmethane, tetraphenylolmethane, and their halogen substitution products and alkyl-group substitution products; glycidylethers synthesized by reacting compounds containing, more than two hydroxygroups such as butanediol, ethyleneglycol, erythrit, novolac, glycerin, and polyoxyalkylene with epichlorolhydrin; glycidylesters such as glycidylester phthalate; glycidylamines synthesized by reacting primary or secondary amines such as aniline, diaminodiphenylmethane, methaxylilenediamine, 1,3-bisaminomethylcyclohexane with epichlorohydrin; glycidylepoxy resin of the above compounds, epoxidated soybean oil; and non-glycidylepoxy resins such as vinylcyclohxenedioxide, dicyclopentadienedioxide. These epoxy resins are used alone or combinations of two or more.

These epoxy resins are used after cured by the curing agent. As described earlier, when an epoxy resin is used for sealing various elements, the epoxy resin is, generally, poured into a casing made of the PAS resin after mixed with a curing agent, and the epoxy resin is then cured by heating, or the like. Examples of curing agents include amines, amino resins, acid anhydrides, polyhydric alcohols, phenol resins, polysulfides, and isocyanates.

The PAS resin compositions of the present invention may be applied not only semiconductor or electric devices represented by the case of car ignition coils applied to the DLI system, but also various applications which require a superior crack resistance property or thermal shock resistance and applications as powder paints, solution-type adhesives, and paints.

DETAILED DESCRIPTION OF THE INVENTION

Hereinafter, practical examples of this application will be described. However, it is to be noted that the present invention is not limited to these embodiments.

Methods of measuring the terminal thiol concentration, logarithmic viscosity (η), melt flow rate, and total sodium content of PPS obtained in reference examples are as follows.

(1) Terminal Thiol Concentration:

The same method as the above described "iodoactoamide" method is used.

(2) Logarithmic Viscosity (η):

A relative viscosity of α-methylchloronaphthalene solution of PPS (PPS concentration is 0.4 g/100 ml) at 206° C. (400° F.) is measured by the following equation.

$\eta = \ln(\text{relative viscosity})/\text{PPS concentration}$ (3) Melt Flow Rate:

The melt flow rate is measured according to ASTM D1238, the diameter and the length of the orifice are 0.0825±0.002 inches and 0.315±0.001 inches, respectively, and conditions of the temperature and the load are 316° C. and 5000 g, respectively.

(4) Total Sodium Content:

The total sodium content is measured by the atomic absorption method for the polymer after sulfate decomposition.

(5) ΔHCl, ΔNaOH 10 ml of HCl is added to 10 g of the polymer and filtrated after stirring. The filtrated solid is repeatedly washed by water until no HCl is detected (until no white turbidity is detected by dripping of $AgNO_3$). All of the filtrate used for washing is collected and HCl in the collected solution is titrated by NaOH, and the molar number of consumed HCL has been defined as ΔHCl.

Subsequently, the polyarylenesulfide resin (A) is re-dispersed in distilled water, and 10 ml of 1 mol/l of NaOH is added and the dispersed system is filtrated after stirring. The filtrated solid is repeatedly washed with water until no NaOH is detected (until no red color is detected by dripping, phenolphthalein). All of the filtrate used for washing is collected and NaOH in the collected solution is titrated by HCl, and the molar number of consumed NaOH is defined as ΔNaOH.

REFERENCE EXAMPLE 1 (PREPARATION OF PPS-1)

7,900 g, of N-methylpyrrolidone, 3,260 g (25 mol, containing 40% crystal water) of sodium sulfate, 4.0 g of sodium hydroxide, and 3,400 g (25 mol) of sodium acetate trihydrate were introduced into an autoclave with a stirrer and the temperature was gradually raised to 205 for two hours in a nitrogen atmosphere, while stirring, and 1,500 ml of liquid distillate including, 1,360 g, of water was removed.

After the reaction system was cooled to 150° C., 3,750 g (25.5 mol) of p-dichlorobenzene and 2,000 g of methylpyrrolidone were added and a two step reaction was conducted at 230° C. for four hours and further at 260° C. for two hours.

Subsequently, the autoclave was cooled and the content was separated by filtration. The cake was then washed by warm water five times, and after dying under reduced pressure, (granular PPS was yielded (yield of 82%).

Furthermore, approximately 2,200 g of this granular PPS resin was placed into 20 l of heated water solution of acetic acid of pH4 and 90° C. The dispersed system was filtrated after stirring for 30 minutes, and the filtrated solid is washed by deionized water at 90° C. until the pH increases to 7, and was dried at 120° C. for 24 hours.

The thus obtained PPS resin showed following characteristic values: the terminal thiol concentration is 40 μmol/g, the logarithmic viscosity (η) is 0.32, and the melt flow rate is 100 g/10 min., the total sodium content is 250 ppm, ΔHCl=2.0 μmol/g, and ΔNaOH=20.0 μmol/g. This resin is referred to as PPS-1.

REFERENCE EXAMPLE 2 (PREPARATION OF PPS-2)

1,993 g of N-methylpyrrolidone, 537 g (4.1 mol) of sodium sulfate 2.7 hydrate, 1.6 g (0.04 mol) of sodium hydroxide, and 144 g (1.0 mol) of sodium benzoate were introduced into an autoclave with a stirrer. The temperature was gradually raised to 200° C. for two hours in nitrogen atmosphere while stirring and 102 ml of water was distilled.

After the reaction system was cooled to 105° C. 603 g (4.1 mol) of p-dichlorobenzene, 1.8 g (0.01 mol) of 1,2,4-trochlorobenzene, and 310 g of N-methylpyrrolidone were added and a two step reaction was conducted at 230° C. for two hours and at 260° C. for three hours. The inner pressure of the autoclave observed was 9.5 Kg/cm² when the polymerization reaction had completed.

Subsequently, the autoclave was cooled, and the content was separated by filtration. The obtained cake was washed by heated water three times, and dried after washing by acetone two times and 394 g of light gray brown granular PPS was yielded (yield=89%).

The thus obtained PPS showed following characteristic values: the terminal thiol-group concentration is 15 μmol/g, the logarithmic viscosity (η) is 0.25, the melt flow rate is 550 g/10 min, the total sodium content is 80 ppm, ΔHCl=10.0 μmol/g, and ΔNaOH=20.0 μmol/g. This resin is referred to as PPS-2.

REFERENCE EXAMPLE 3 (PREPARATION OF PPS-3)

1233 g of methylpyrrolidone, 636 g (5.0 mol, 61.5% by analysis) of sodium sulfate 2.7 hydrate 510 g (5.0 mol) of lithium acetate dihydrate, and 90 g (5.0 mol) of water were introduced into an autoclave with a stirrer. 290 ml of liquid distillate including 257 g of water was generated by a reaction at 205° C. for approximately one hour and twenty minutes in a nitrogen atmosphere while stirring.

After the reaction system was cooled to 150° C., a solution of 750 g (5.1 mol) of p-dichlorobenzene in 400 g of N-methylpyrrolidone was added and a reaction was conducted at 265° C. for three hours. The inner pressure of the autoclave when the reaction had completed was 9.0 Kg/min.

Subsequently, the autoclave was cooled to 150° C. and the content was separated by filtration. The obtained cake was washed by heated water three times, and after washed by acetone two times, the cake was immersed in HCl solution of pH 1 at room temperature for 30 min. 467 g of PPS resin was yielded after washing by deionized waiter and drying at 80° C. under reduced pressure (yield=86%).

The thus obtained PPS showed following characteristic values: the terminal thiol-group concentration is 35 μmmol/g, the logarithmic viscosity (η) is 0.25, the melt flow rate is 550 g/10 min, the total sodium content is 100 ppm, ΔHCl=1.0 μmol/g, and ΔNaOH=12.0 μmol/g. This resin is referred to as PPS-3.

EXAMPLES 1-10

The PPS resins produced according to respective Reference Examples and respective combining compounds shown in Tables 1 and 2 were mixed homogeneously at mixing ratios shown in the same Table and the mixture was melted and kneaded by means of a biaxial extruder with a diameter of 35 mm at 300° C. and pellets were obtained. The properties and compatibility of those sample pellets were evaluated by use of test pieces which are formed by a three ounce-type injection molding machine under conditions of the cylinder temperature at 290° C. the mold temperature at 140° C., the injection pressure of 1,000 Kgf/cm², and a medium injection speed. The results of evaluations were shown in Table 1 and 2. A chopped strand glass fiber was used as glass fiber shown in Tables 1 and 2.

The following properties were evaluated.

<Mechanical Properties>

(1) Izod Impact Strength

Impact strengths for both notched and non-notched test pieces of ⅛ inch thick, ½ inch wide, and 2.5 inches long were measured according to ASTM D-256. One measured value was obtained by measuring five test pieces.

(2) Crack Resistance Property

Figure 1:
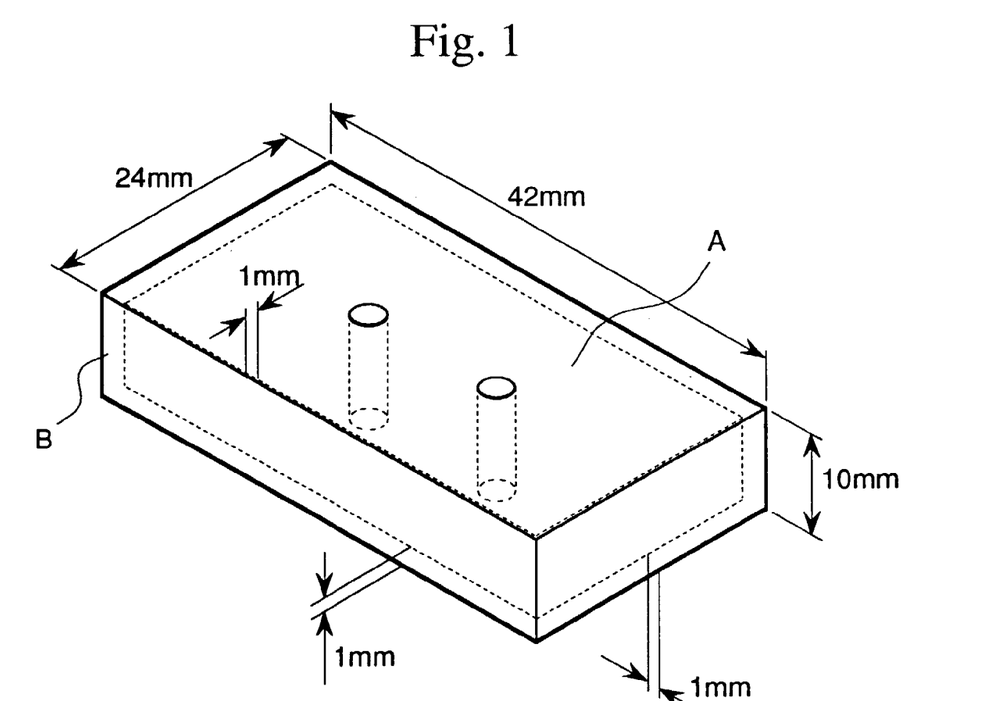
FIG. 1 is a diagram showing an insert-type test piece used for evaluation of Examples 1 to 10 and Comparative Examples 1 to 9, wherein A is a metal (S55C) block, and B is the present resin compositions prepared by the above Examples.

Insert-type formed products, each formed by covering a metal (S55C) block A with a resin layer B of 1 mm thick as shown in FIG. 1 were subjected to a heating and cooling cycle test in vapor phase, in which one cycle was set "–40° C./one hour~140° C./one hour", and the number of cycles at which cracks are generated at the outer wall was recorded. The number of test pieces for the test was n=5.

The test results were evaluated by ranks according, to the following rule.

Crack was generated less than 10 cycles . . . "E" rank

Crack was generated within a range of 10-less than 100 cycles . . . "D" rank.

Crack was generated within a range of 100-less than 300 cycles . . . "C" rank

Crack was generated within a range of 300-less than 1,000 cycles . . . "B" rank

Crack was generated more than 1,000 cycles . . . "A" rank

<Compatibility>

The compatibility was evaluated according to a following standard by visual inspections of the appearance of sheets having dimensions of 2 mm thick, 50 mm wide, and 100 mm long, using a film gate ○ . . . the surface of a formed product is smooth and no peeling is observed;

Δ . . . the surface is uneven and an opal-like gloss is observed.

x . . . the surface of the formed product is uneven and peeling is observed.

<Dispersed Particle Size of the Impact Resistance Improving Component>

Fractured surfaces of test pieces with notches after testing Izod impact strength were observed after immersion in heated xylene by a scanning electron microscope (magnification: 2,500 times).

<Adhesive Strength to the Cured Epoxy Resin>

Test pieces with dimensions of 25 mm wide, 75 mm long and 3 mm thick were formed by the present resin and an epoxy resin was coated to a thickness of 40 to 50 μm on the test piece at a surface area of 25 mm×10 mm. After fixing by a clip, the coated layer was cured by treating first by being maintained at 85° C. for three hours, then being maintained at 150° C. for three hours and finally by annealing. The tensile shearing strength was then measured at a drawing speed or 5 mm/min., and the actual loads were recorded.

The epoxy resin used for measuring the adhesive strength is as follows:

Main component: Epicron 850 (produced by Dainippon Ink & Chemicals Co. Ltd.containing silica) (filling rate: 50 wt %)

Curing agent: hexahydrophthalic acid anhydride

The ratio of the main component/curing agent=100/30.

<Epoxy-Potting Material Adhesive Strength>

A box-shaped product with a base of 30 mm in width and 80 mm in length and with a height of 15 mm and a wall thickness of 2 mm is formed, and the same epoxy resin used for measuring adhesive strength was poured to the height of 10 mm, and cured under the same conditions. The heating and cooling cycle tests were executed in a gas phase by repeating the cycles of "−40° C./one hour-140° C./one hour", and the number of cycles until peeling occurs at the interface between the inner surface of the box-shaped product and the cured epoxy resin was recorded.

The evaluation was carried out by ranking the number of cycles as follows.

Peeling was caused less than 10 cycles: rank IV

Peeling was caused in a range equal to or more than 10 to less than 100 cycles . . . rank "III", Peeling was caused in a range equal to or more than 100 to less than 300 cycles . . . rank "II", Peeling was caused equal to or more than 300 cycles . . . "I".

TABLE 1

|  | Example 2 | Example 2 | Example 3 | Example 4 | Example 5 |
|---|---|---|---|---|---|
| PPS resin | PPS-1 (80) | PPS-1 (77) | PPS-1 (70) | PPS-2 (50) | PPS-3 (55) |
| Epoxy resin | B-1 (2) | B-1 (5) | B-2 (6.5) | B-2 (3) | B-1 (10) |
| Oxazoline-type resin | C-1 (15) | C-1 (3) | C-2 (12) | C-2 (12) | C-2 (10) |
| Impact resistance improving rein | D-1 (3) | D-2 (15) | D-3 (10) | D-4 (15) | D-5 (5) |
| Glass fiber | — | — | — | (20) | (20) |
| Silane compounds | — | — | F-1 (1) | — | — |
| G component | — | — | G-1 (1) | — | — |
| Impact strength J/m |  |  |  |  |  |
| With notch: | 120 | 200 | 160 | 130 | 100 |
| without notch | 900 | >2,000 | >2,000 | 600 | 640 |
| Crack resistance property | B | B | B | A | A |
| Compatibility | ○ | ○ | ○ | ○ | ○ |
| Gum-particle size: μm | 0.5-0.8 | <0.5 | 0.5-0.8 | <0.5 | 0.5-0.8 |

TABLE 1-continued

|  | Example 2 | Example 2 | Example 3 | Example 4 | Example 5 |
|---|---|---|---|---|---|
| Adhesive strength, | 180 | 155 | 195 | 215 | 230 |
| Adherence | II | II | II | I | I |

TABLE 2

|  | Example 6 | Example 7 | Example 8 | Example 9 | Example 10 |
|---|---|---|---|---|---|
| PPS resin | PPS-3 (66) | PPS-3 (60) | PPS-3 (53) | PPS-2 (45) | PPS-3 (40) |
| Epoxy resin | B-1 (6) | B-1 (5) | B-1 (5) | B-1 (3) | B-2 (2) |
| Oxazoline-type resin | C-1 (2) | C-1 (7.7) | C-1 (6.7) | C-2 (6) | C-2 (3.5) |
| Impact resistance improving rein | D-6 (6) | D-2 (6) | D-7 (4) | D-8 (4.5) | D-1 (3) |
| Glass fiber | (20) | (20) | (30) | (40) | (50) |
| Silane compounds | — | F-1 (1) | F-1 (1) | F-2 (1) | F-3 (1) |
| G component | — | G-2 (0.3) | G-3 (0.3) | G-2 (0.5) | G-3 (0.5) |
| Impact strength J/m |  |  |  |  |  |
| With notch: | 110 | 110 | 100 | 95 | 85 |
| without notch | 700 | 720 | 750 | 750 | 720 |
| Crack resistance property | A | A | A | A | A |
| Compatibility | ○ | ○ | ○ | ○ | ○ |
| Gum-particle size: μm | 0.5-0.8 | <0.5 | <0.5 | 0.5-0.8 | 0.5-0.8 |
| Adhesive strength, | 190 | 250 | 240 | 230 | 200 |
| Adherence | I | I | I | I | I |

COMPARATIVE EXAMPLES 1 to 9

The PPS resins produced according to respective Reference Examples and respective combining compounds shown in Tables 3 and 4 were mixed homogeneously at mixing ratios shown in the same Table and the mixture was melted and kneaded by means of a biaxial extruder at 300° C. and pellets were obtained. The same properties as those for Examples 1 to 10 were evaluated. The results were shown in Tables 3 and 4.

TABLE 3

|  | Comparative Example 1 | Comparative Example 2 | Comparative Example 3 | Comparative Example 4 | Comparative Example 5 |
|---|---|---|---|---|---|
| PPS resin | PPS-1 (77) | PPS-1 (77) | PPS-1 (70) | PPS-9 (65) | PPS-3 (65) |
| Epoxy resin | B-3 (5) | B-4 (5) | B-2 (6.5) | B-2 (3) | — |
| Oxazoline-type resin | — | C-1 (3) | C-2 (12) | C-2 (12) | C-2 (10) |
| Impact resistance improving rein | D-2 (15) | D-2 (15) | D-9 (10) | — | D-5 (5) |
| Glass fiber | — | — | — | (20) | (20) |
| Silane compounds | — | — | F-1 (1) | — | — |
| G component | — | — | G-1 (1) | — | — |
| Impact strength J/m |  |  |  |  |  |
| With notch: | 45 | 50 | 45 | 35 | 68 |
| without notch | 380 | 400 | 380 | 350 | 470 |

TABLE 3-continued

|  | Comparative Example 1 | Comparative Example 2 | Comparative Example 3 | Comparative Example 4 | Comparative Example 5 |
|---|---|---|---|---|---|
| Crack resistance property | E | E | E | E | E |
| Compatibility | x | x | x | — | Δ |
| Gum-particle size: μm | 1.0-2.0 | 1.0-2.0 | 1.0-2.0 | — | 1.0-2.0 |
| Adhesive strength, | 75 | 70 | 80 | 85 | 70 |
| Adherence | IV | IV | IV | IV | IV |

TABLE 4

|  | Comparative Example 6 | Comparative Example 7 | Comparative Example 8 | Comparative Example 9 |
|---|---|---|---|---|
| PPS resin | PPS-3 (66) | PPS-3 (58) | PPS-2 (51) | PPS-3 (78) |
| Epoxy resin | B-1 (6) | — | B-1 (3) | — |
| Oxazoline-type resin | — | — | — | — |
| Impact resistance improving resin | D-6 (6) | D-3 (10) | D-3 (4.5) | — |
| Glass fiber | (20) | (30) | (40) | (20) |
| Silane Compounds | — | — | F-2 (1) | F-2 (1) |
| G component | — | — | — | G-2 (1) |
| Amide-type wax | — | (2) | (0.5) | — |
| Impact strength J/m |  |  |  |  |
| With notch: | 60 | 70 | 72 | 25 |
| without notch | 440 | 480 | 490 | 280 |
| Crack resistance property | E | E | E | E |
| Compatibility | Δ | Δ | Δ | ○ |
| Gum-particle size: μm | 1.0–2.0 | 1.0–2.0 | 1.0–2.0 | — |
| Adhesive strength, | 85 | 90 | 95 | 68 |
| Adherence | IV | IV | IV | IV |

In Tables 1 to 4, numeral values in parentheses represent weight %, and G components represent the ester of the higher fatty acid ester of polyhydric alcohol. Abbreviations in those tables indicate following compounds.

B-1: bisphenol A-type epoxy resin, epoxy equivalent 2,000;

B-2: bisphenol A-type epoxy resin, epoxy equivalent 190;

B-3: bisphenol S-type epoxy resin, epoxy equivalent 210 (Trade name: Epicron EXA-1514, produced by Dainippon Ink and Chemicals Inc.);

B-4: epoxidated product of 1,6-dihydroxynaphthalene, epoxy equivalent 150 (Trade name: Epicron XP4032, proced by Dainippon Ink and Chemicals Inc.).

The above compounds are bisphenol A-type epoxy resin (B).

C-1: oxazoline containing 5 wt % of vinyloxazoline/styrene copolymer;

C-2: oxazoline containing 5 wt % of vinyloxazoline/styrene/acrylonitrile copolymer, styrene/acrylonitrile=70/25.

The above compounds are oxazoline-group-containing polymer (C).

D-1: maleic acid anhydride (Maah), graftetylene (Et), and propylene (PP) copolymer, Et/PP/Maah=58/40/2.

D-2: ethylene/ethylacrylate (EA)/maleic acid anhydride ternary copolymer, Et/EA/Maah=66/32/2.

D-3: ethylene/glycidylmethacrylate (GMA) copolymer, Et/GMA=88/12.

D-4: ethylene/ethylacrylate/glycidylmethacrylate ternary copolymer, Et/EA/GMA=68/24/8.

D-5: maleicacid anhydride-graft-styrene/butadiene/styrene block hydrogenated copolymer, ethylene-butene/styrene/Maah=68/30/2.

D-6: GMA copolymerized styrene/butadiene/styrene block hydrogenated copolymer, ethylene-butane/styrene/GMA=68/30/2.

D-7: ethylacrylate/butylacrylate (BA)/maleic acid anhydride copolymer, EA/BA/Maah=62/36/2.

D-8: ethylacrylate/butylacrylate (BA)/glycidylmethacrylate copolymer, EA/BA/GMA=62/36/2=68/30/2.

D-9: ethylene/ethylacrylate (EA) copolymer, Et/EA=85/15.

The above compounds are impact resistance improving resins (D).

F-1: γ-glycidoxypropyltrimethoxysilane;
F-2: γ-aminopropyltriethoxysilane;
F-3: isocyanatepropyltriethoxysilane.

The above compounds are silane compounds (F).

G-1: ethyleneglycoldimontanate;
G-2: tromethylolpropanetrimontanate;
G-3: pentaerythritoltetrastearate.

The above compounds are esters of higher fatty acid of polyhydric alcohol.

The other components:

Amide-type wax; and amidecarboxylate-type wax which is a reaction product of stearic acid, sebacic acid, and ethylenediamine (an endothermic peak by the DSC measurement appeared at 143° C.), and content of ethylenebisstearylamide is 30%.

According to the present invention, it becomes possible to improve dramatically the adhesive strength of the PAS resin to the cured epoxy resin, and to improve dramatically the crack resistance property or the PAS resin when subjected to heating and cooling cycles by the use of an impact resistance improving resin.

Accordingly, the resin compositions of the present invention can be used as superior engineering plastics in wide application fields such as electronic and other devices.

What is claimed:

1. A polyarylenesulfide resin composition comprising:
   an arylenesulfide resin (A),
   a bisphenol A epoxy resin (B), and
   an amorphous polymer (C) containing an oxazoline group,
   wherein the amorphous polymer (C) is a copolymer of vinyl oxazoline and styrene.

2. The polyarylenesulfide resin composition of claim 1, wherein the polyarylenesulfide resin (A) is in a range of 30 to 90 wt %, the bisphenol A epoxy resin (B) is in a range of 1 to 10 wt %, and the amorphous polymer (C) containing an oxazoline group is in a range of 1 to 20 wt %.

3. A polyarylenesulfide resin composition comprising:
   an arylenesulfide resin (A),
   a bisphenol A epoxy resin (B), and
   an amorphous polymer (C) containing an oxazoline group,
   wherein the amorphous polymer (C) is a copolymer of vinyl oxazoline and acrylonitrile.

4. A polyarylenesulfide resin composition comprising:
   an arylenesulfide resin (A),
   a bisphenol A epoxy resin (B), and
   an amorphous polymer (C) containing an oxazoline group, wherein the amorphous polymer (C) is a copolymer of vinyl oxazoline, styrene and acrylonitrile.

5. The polyarylenesulfide resin composition of claim 3, wherein the polyarylenesulfide resin (A) is in a range of 30 to 90 wt %, the bisphenol A epoxy resin (B) is in a range of 1 to 10 wt %, and the amorphous polymer (C) containing an oxazoline group is in a range of 1 to 20 wt %.

6. The polyarylenesulfide resin composition of claim 4, wherein the polyarylenesulfide resin (A) is in a range of 30 to 90 wt %, the bisphenol A epoxy resin (B) is in a range of 1 to 10 wt %, and the amorphous polymer (C) containing an oxazoline group is in a range of 1 to 20 wt %.

* * * * *